(12) United States Patent
Yamaguchi et al.

(10) Patent No.: US 11,566,558 B2
(45) Date of Patent: Jan. 31, 2023

(54) CONTROLLER OF FAN COUPLING DEVICE

(71) Applicant: TOYOTA JIDOSHA KABUSHIKI KAISHA, Toyota (JP)

(72) Inventors: Masaaki Yamaguchi, Okazaki (JP); Toshio Takaoka, Toyota (JP); Noboru Takagi, Toyota (JP); Shoichi Akiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 17/214,212

(22) Filed: Mar. 26, 2021

(65) Prior Publication Data

US 2021/0332739 A1  Oct. 28, 2021

(30) Foreign Application Priority Data

Apr. 28, 2020  (JP) .............................. JP2020-079560

(51) Int. Cl.
*F01P 7/04* (2006.01)
*F16D 48/06* (2006.01)
*F16D 35/02* (2006.01)

(52) U.S. Cl.
CPC .............. *F01P 7/042* (2013.01); *F16D 48/06* (2013.01); *F01P 2025/64* (2013.01); *F16D 35/024* (2013.01); *F16D 2500/10468* (2013.01)

(58) Field of Classification Search
CPC .... F01P 7/042; F01P 2025/64; F01P 2037/00; F01P 5/02; F01P 5/04; F16D 48/06; F16D 35/024; F16D 2500/10468; F16D 33/00; F16D 2300/0214
See application file for complete search history.

(56) References Cited

U.S. PATENT DOCUMENTS

| | | | | |
|---|---|---|---|---|
| 4,550,695 A | * | 11/1985 | Kikuchi ................ | F01P 7/081 192/82 T |
| 2007/0068762 A1 | * | 3/2007 | Bhat ..................... | F01P 7/042 192/58.61 |
| 2008/0217132 A1 | * | 9/2008 | Sato ..................... | F16D 35/025 192/58.63 |
| 2016/0097293 A1 | * | 4/2016 | Svihla .................. | F16J 15/447 277/424 |
| 2018/0298805 A1 | * | 10/2018 | Kinugawa ............. | F01P 5/04 |
| 2018/0371980 A1 | * | 12/2018 | Minagawa ............. | F01P 5/04 |

FOREIGN PATENT DOCUMENTS

| JP | 2019-007429 A | 1/2019 |
|---|---|---|
| JP | 2019-007430 A | 1/2019 |

* cited by examiner

*Primary Examiner* — Syed O Hasan
(74) *Attorney, Agent, or Firm* — Finnegan, Henderson, Farabow, Garrett & Dunner, LLP (57) ABSTRACT

A controller of a fan coupling device includes: an acquisition unit that acquires an acceleration parameter and a deviation parameter; a control unit that controls a regulation mechanism; a prediction unit that predicts that hunting occurs in the rotation speed of the fan, when an operating point of the fan expressed with the deviation parameter and the acceleration parameter belongs to a predicted region; and a restraining unit that executes, when the hunting is predicted to occur, a hunting restraining process of executing at least one of lowering an integral gain of a feedback control to be lower than when the hunting is not predicted to occur and increasing a derivative gain of the feedback control to be higher than when the hunting is not predicted to occur.

13 Claims, 7 Drawing Sheets

CONTROLLER OF FAN COUPLING DEVICE

CROSS-REFERENCE TO RELATED APPLICATION

This application claims priority to Japanese Patent Application No. 2020-079560 filed on Apr. 28, 2020, incorporated herein by reference in its entirety

BACKGROUND

1. Technical Field

The present disclosure relates to a controller of a fan coupling device.

2. Description of Related Art

There is known, as a controller of a fan coupling device, a controller configured to execute feedback control by setting a control gain based on deviation between actual rotation speed and target rotation speed of a fan (see, for example, Japanese Unexamined Patent Application Publication No. 2019-007430 (JP 2019-007430 A)).

SUMMARY

However, when a response delay occurs due to such reasons as characteristic variations and secular changes of the fan coupling device, so-called hunting, which is a repetition of increase and decrease of the rotation speed of the fan, may possibly occur.

Accordingly, it is an object of the present disclosure to provide a controller of a fan coupling device in which hunting of the rotation speed of a fan is restrained.

The above object can be accomplished by a controller of a fan coupling device. The fan coupling device includes a drive shaft, a rotor, a housing, a fan, a labyrinth chamber, and a regulation mechanism. The drive shaft is rotationally driven. The rotor is coupled to the drive shaft. The housing is configured to house the rotor, the housing being supported so as to be rotatable relative to the rotor. The fan is fixed to the housing. The labyrinth chamber is formed between the housing and the rotor in the housing and configured to transmit rotational motive power of the rotor to the housing through working fluid. The regulation mechanism is configured to regulate an amount of the working fluid in the labyrinth chamber. The controller includes: an acquisition unit; a control unit; a prediction unit; and a restraining unit. The acquisition unit is configured to acquire an acceleration parameter corresponding to an actual rotation acceleration of the fan and a deviation parameter corresponding to a deviation that is a value obtained by subtracting a target rotation speed of the fan from an actual rotation speed of the fan. The control unit is configured to control the regulation mechanism by feedback control based on the deviation parameter. The prediction unit is configured to predict that hunting occurs in the rotation speed of the fan, when an operating point of the fan expressed with the deviation parameter and the acceleration parameter belongs to a predicted region, out of the predicted region and a non-predicted region other than the predicted region defined by a coordinate system having the deviation parameter as a horizontal axis and the acceleration parameter as a vertical axis. The restraining unit is configured to execute, when the hunting is predicted to occur, a hunting restraining process of executing at least one of lowering an integral gain of the feedback control to be lower than when the hunting is not predicted to occur and increasing a derivative gain of the feedback control to be higher than when the hunting is not predicted to occur.

The predicted region may be at least in some part of a first quadrant and some part of a third quadrant of the coordinate system. The non-predicted region may be at least in some part of a second quadrant and some part of a fourth quadrant of the coordinate system.

In the first quadrant of the coordinate system, a first boundary line indicating a boundary between the predicted region and the non-predicted region may be apart from the horizontal axis and extends along the horizontal axis. The non-predicted region may be on the side of the fourth quadrant of the coordinate system from the first boundary line, and the predicted region may be on the opposite side of the fourth quadrant from the first boundary line.

A second boundary line indicating a boundary between the predicted region and the non-predicted region in the second quadrant of the coordinate system may be apart from the horizontal axis such the deviation parameter approaches zero as the acceleration parameter approaches zero. The predicted region may be on the side of the first quadrant of the coordinate system from the second boundary line, and the non-predicted region may be on the side of the third quadrant of the coordinate system.

In the third quadrant of the coordinate system, a third boundary line indicating a boundary between the predicted region and the non-predicted region may be apart from the horizontal axis and extend along the horizontal axis. The non-predicted region may be on the side of the second quadrant of the coordinate system from the third boundary line, and the predicted region may be on the opposite side of the second quadrant of the coordinate system from the third boundary line.

A fourth boundary line indicating a boundary between the predicted region and the non-predicted region in the fourth quadrant of the coordinate system may be apart from the horizontal axis such that the deviation parameter approaches zero as the acceleration parameter approaches zero. The predicted region may be on the side of the third quadrant of the coordinate system from the fourth boundary line, and the non-predicted region may be on the side of the first quadrant.

The non-predicted region may include a prescribed range around an origin of the coordinate system in the fourth quadrant of the coordinate system.

The non-predicted region may include a prescribed range around the origin of the coordinate system in the second quadrant of the coordinate system.

The non-predicted region may include a prescribed range around the origin of the coordinate system.

The predicted region may be symmetric with respect to the origin in the coordinate system.

The predicted region may be asymmetric with respect to the origin in the coordinate system.

The restraining unit may execute, while the operating point of the fan belongs to the predicted region, at least one of lowering the integral gain to be lower than while the operating point of the fan belongs to the non-predicted region and increasing the derivative gain to be higher than while the operating point of the fan belongs to the non-predicted region as the hunting restraining process, and may stop the hunting restraining process while the operating point of the fan is out of the predicted region and belongs to the non-predicted region.

After the hunting is predicted to occur, the restraining unit may execute, as the hunting restraining process, at least one of lowering the integral gain to be lower than before the hunting is predicted to occur and increasing the derivative gain to be higher than before the hunting is predicted to occur.

The present disclosure can provide the controller of a fan coupling device in which hunting of the rotation speed of a fan is restrained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Schematic Configuration of Vehicle

Figure 1:
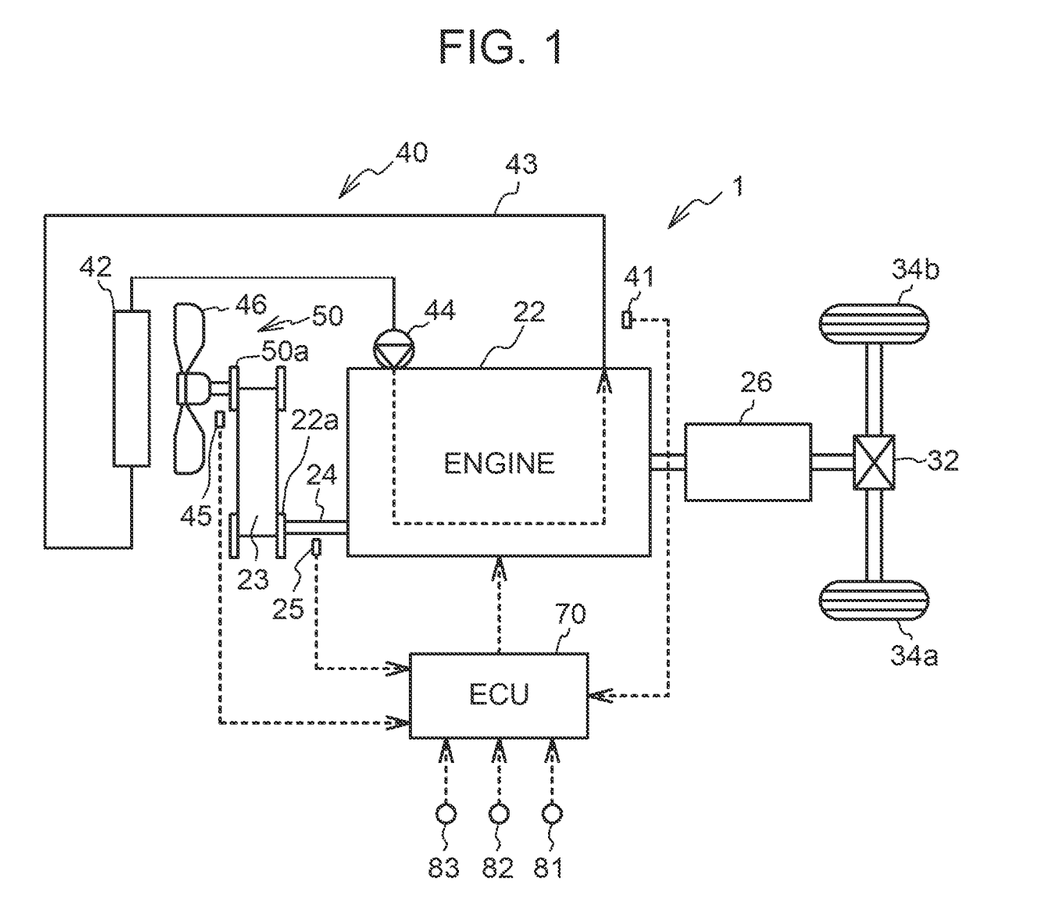
FIG. 1 shows an overall configuration of a vehicle in a present embodiment.

FIG. 1 shows an overall configuration of a vehicle 1 in the present embodiment. The vehicle 1 in the embodiment includes an engine 22, an automatic transmission 26 that changes the speed of motive power output to a crankshaft 24 from the engine 22 and transmits the motive power to wheels 34a, 34b through a differential gear 32, a cooling device 40 that cools the engine 22 using coolant with the motive power from the engine 22, and an electronic control unit (ECU) 70 that controls the entire vehicle. The engine 22 may be a gasoline engine or may be a diesel engine. The vehicle 1 may also be a hybrid vehicle.

The cooling device 40 includes a radiator 42 that performs heat exchange between the coolant of the engine 22 and ambient air, a water pump 44 driven with the motive power of the engine 22 to circulate the coolant in a circulation path 43 which connects the radiator 42 and the engine 22, and a fan 46 rotationally driven with the motive power input from the engine 22 through a fan coupling device 50.

With a belt 23 placed over a pulley 50a attached to a later-described drive shaft 51 and a pulley 22a of the engine 22, the fan coupling device 50 transmits the motive power input from the engine 22 to the fan 46 using later-described working fluid.

The ECU 70 includes a central processing unit (CPU), a random access memory (RAM), and a read only memory (ROM). The ECU 70 controls the engine 22 by executing programs stored in the RAM or ROM. The ECU 70 is also electrically connected to an ignition switch 81, a crank angle sensor 25 that detects the rotation speed of the crankshaft 24 of the engine 22, a rotation speed sensor 45 that detects the rotation speed of the fan 46, an accelerator pedal position sensor 82 that detects an accelerator operation amount, a vehicle speed sensor 83 that detects a vehicle speed, and a coolant temperature sensor 41 that detects an outlet temperature of the coolant. As described later in detail, the ECU 70 controls the fan coupling device 50, and also functionally implements an acquisition unit that acquires prescribed information and a control unit that controls a regulation mechanism 60 described later.

Configuration of Fan Coupling Device

Figure 2:
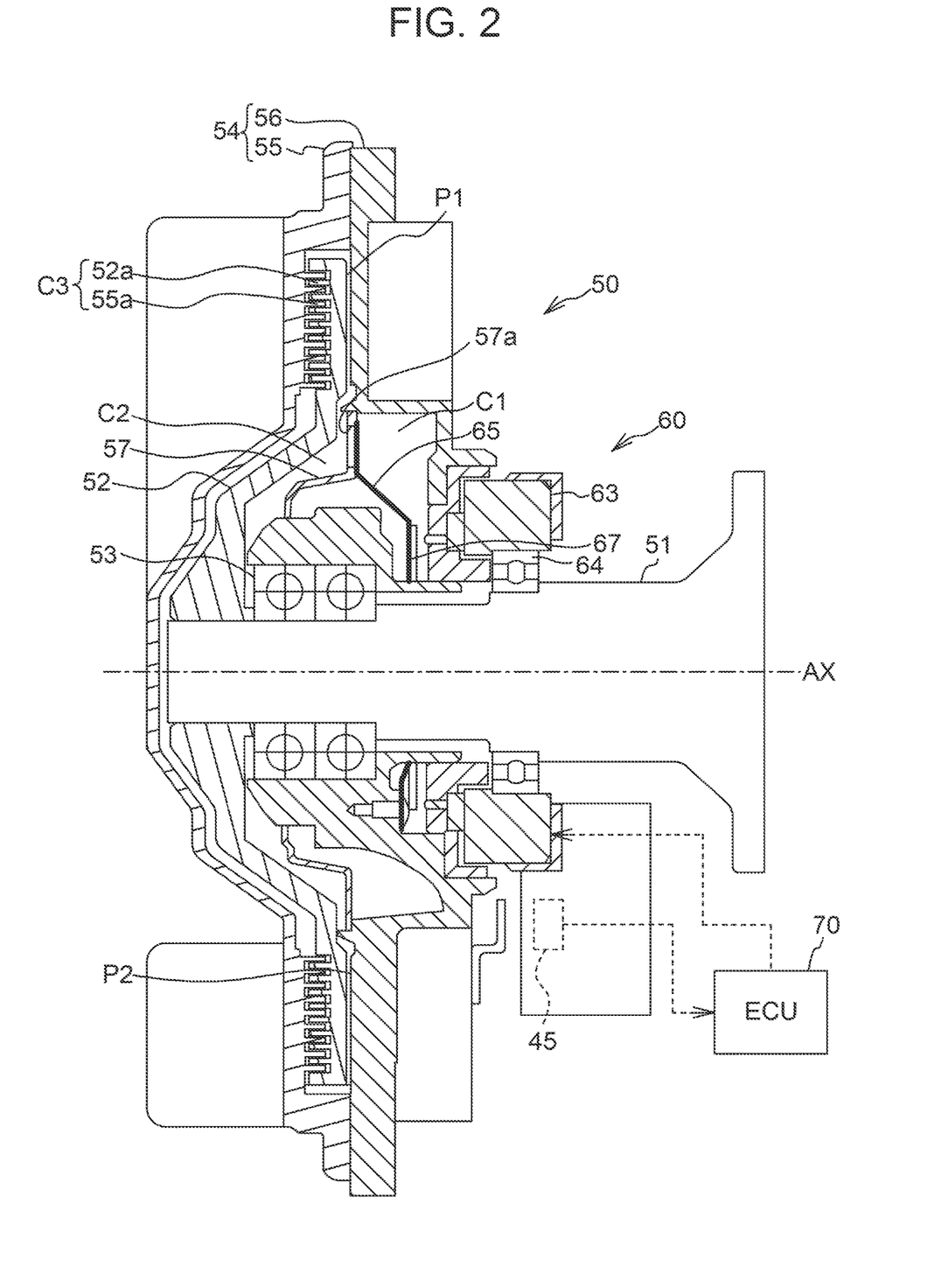
FIG. 2 is a sectional view of a fan coupling device.

FIG. 2 is a sectional view of the fan coupling device 50. The fan coupling device 50 includes the drive shaft 51, a rotor 52, a housing 54, a divider 57, and a regulation mechanism 60. In the housing 54, silicone oil with a high viscosity is enclosed as working fluid, for example. Henceforth, the working fluid is referred to as hydraulic oil.

Between the drive shaft 51 and the housing 54, two bearings 53 are provided. Fixed to a distal-end portion of the drive shaft 51 is the rotor 52 having an approximately disc-shape. Fixed to a base end portion of the drive shaft 51 is the pulley 50a shown in FIG. 1. The drive shaft 51 and the rotor 52 rotate when the rotational motive power of the crankshaft 24 shown in FIG. 1 is transmitted through the belt 23 and the pulley 50a. In FIG. 2, a center axis line AX of the drive shaft 51 is illustrated.

The housing 54 includes a cover portion 55 and a body portion 56 which are fixed to each other. The cover portion 55 is located on the distal-end side of the drive shaft 51, and the body portion 56 is located closer to the proximal-end side of the drive shaft 51 than the cover portion 55. The drive shaft 51 is held so as to be rotatable relative to the body portion 56 through the bearing 53. The fan 46 not shown in FIG. 2 is provided in an outer peripheral portion of the housing 54. On a back surface side of the body portion 56, the rotation speed sensor 45 is provided to detect the rotation speed of the body portion 56 which rotates integrally with the fan 46.

The inside of the housing 54 is divided by the divider 57 into a storage chamber C1 and a working chamber C2. The storage chamber C1 is provided on the side of the body portion 56. The working chamber C2 is provided on the side of the cover portion 55. The divider 57 has a communicating port 57a provided so as to communicate with the storage chamber C1 and the working chamber C2.

The rotor 52 is housed in the working chamber C2. The rotor 52 has a plurality of ribs 52a provided in a concentric circular shape. Similarly, on the inner side of the cover portion 55, a plurality of ribs 55a is provided in a concentric circular shape. When these ribs 52a and 55a gear each other, a labyrinth chamber C3 which is space like a labyrinth is formed.

Between the back surface side of the rotor 52 and the inner side of the body portion 56, a supply passage P1 is formed so as to connect the central side and the outer peripheral side of the rotor 52. On the opposite side of the central portion of the rotor 52 from the supply passage P1, a collection passage P2 is formed so as to connect the central side and the outer peripheral side of the rotor 52. The hydraulic oil discharged from the labyrinth chamber C3 flows into the storage chamber C1 through the collection passage P2.

The regulation mechanism 60 regulates the oil amount in the labyrinth chamber C3. The regulation mechanism 60 includes an electromagnet 63, a valve body 65, and an armature 67. The valve body 65 is a plate-shaped member made of an elastically deformable metal. The valve body 65 is fixed at its base end portion to the body portion 56 with a screw. The armature 67 is fixed to the surface of the valve body 65 on the side of the electromagnet 63. The armature 67 is biased with a spring, which is not shown, toward the divider 57. Thus, the distal-end portion of the valve body 65 closes the communicating port 57a.

The ECU 70 controls energizing and non-energizing of the electromagnet 63. When the electromagnet 63 is in a non-energized state, the distal-end portion of the valve body 65 closes the communicating port 57a as described above. When the electromagnet 63 is energized, the armature 67 is magnetically attracted toward the electromagnet 63, and the distal-end portion of the valve body 65 is elastically deformed so as to be separated from the communicating port 57a against the biasing force of the spring described above. Here, the ECU 70 controls energizing and non-energizing of the electromagnet 63 through pulse width modulation (PWM) control. More specifically, the ECU 70 can regulate the opening degree of the communicating port 57a by regulating a duty ratio of a drive voltage of the electromagnet 63.

The electromagnet 63, which is formed in an annular shape, is provided in the state of being inserted into the drive shaft 51. The electromagnet 63 is fixed to the vehicle mounted with an internal combustion engine, the internal combustion engine itself, or other auxiliary machines. Between the drive shaft 51 and the electromagnet 63, a bearing 64 is disposed. Since the drive shaft 51 and the electromagnet 63 can rotate in a relative manner, the drive shaft 51 can rotate while the electromagnet 63 is fixed to the vehicle or the like.

When the electromagnet 63 is energized and the valve body 65 opens the communicating port 57a, the hydraulic oil is supplied to the working chamber C2 from the storage chamber C1, and is supplied to the labyrinth chamber C3 through the supply passage P1. Due to viscous resistance of the hydraulic oil in the labyrinth chamber C3, the rotation torque of the rotor 52 is transmitted to the housing 54, and thereby the housing 54 and the fan 46 rotate. As a consequence, the rotation speed of cooling air sucked into the radiator 42 increases even with the vehicle rotation speed unchanged, so that the amount of heat radiation from the radiator 42 increases. When the amount of heat radiation from the radiator 42 increases, the temperature of coolant changes to be lower. The hydraulic oil discharged from the labyrinth chamber C3 is collected into the storage chamber C1 through the collection passage P2. In the state where the communicating port 57a is open, the hydraulic oil collected into the storage chamber C1 is again supplied to the working chamber C2.

When the electromagnet 63 is put in the non-energized state and the valve body 65 closes the communicating port 57a, the hydraulic oil discharged from the labyrinth chamber C3 is collected into the storage chamber C1, and supply of the hydraulic oil to the working chamber C2 is stopped. When the hydraulic oil is completely discharged from the labyrinth chamber C3, the rotation torque of the rotor 52 is not transmitted to the housing 54, and only the rotor 52 rotates. This means that the fan 46 stops its rotation.

The ECU 70 generates a drive signal through the feedback control based on later-described deviation to control the electromagnet 63. Thus, the oil amount in the labyrinth chamber C3 is regulated, and the rotation speed of the fan 46 can be adjusted to a desired rotation speed.

Hunting Prediction and Restraining Control

Figure 3:
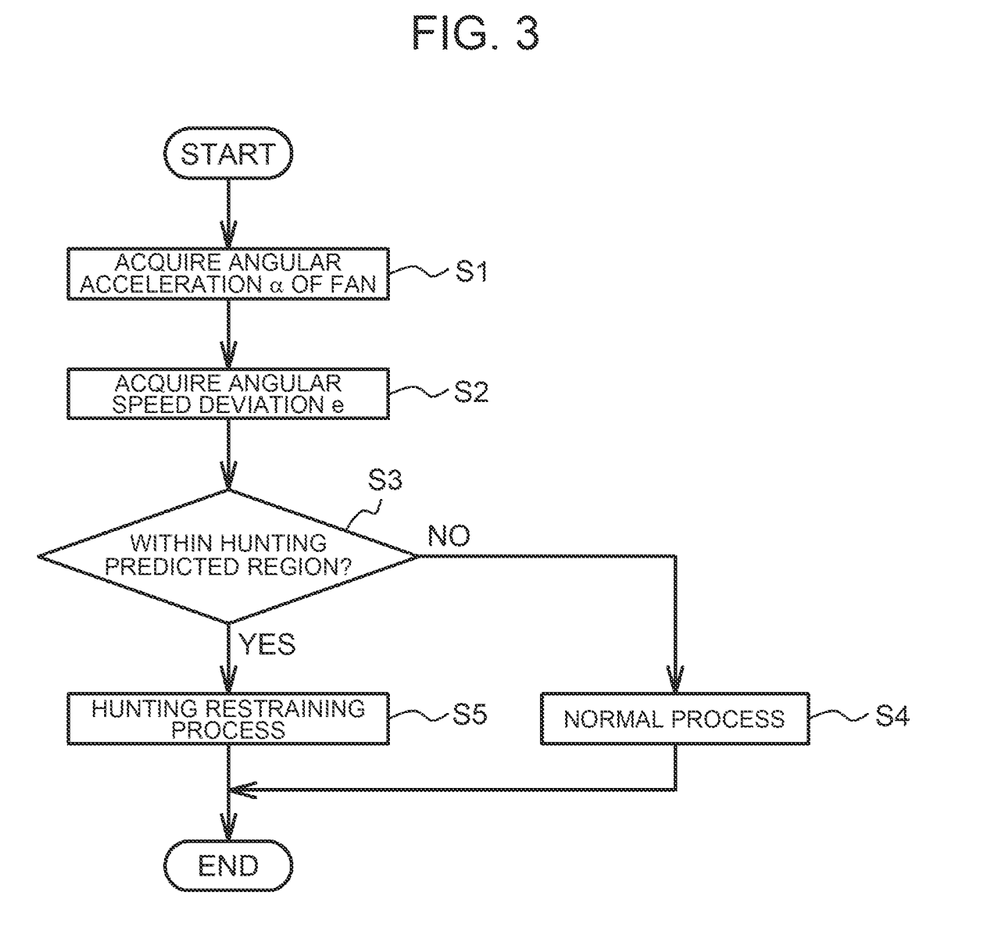
FIG. 3 is a flowchart showing an example of hunting prediction and restraining control executed by an ECU.

Description is now given of the hunting prediction and restraining control executed by the ECU 70. FIG. 3 is a flowchart showing an example of the hunting prediction and restraining control executed by the ECU 70. The control is repeatedly executed. The ECU 70 acquires an angular acceleration $\alpha$ [rad/s] of the fan 46 based on a detection value from the rotation speed sensor 45 (step S1). Specifically, the ECU 70 calculates an actual angular speed [rad] based on an actual rotation speed [rpm] of the fan 46 detected by the rotation speed sensor 45, and differentiates the actual angular speed by time to calculate an angular acceleration $\alpha$ of the fan 46. The angular acceleration $\alpha$ is an example of the acceleration parameter corresponding to the actual rotation acceleration of the fan 46. The process of step S1 is an example of the process executed by the acquisition unit.

Next, the ECU 70 acquires an angular speed deviation e that is a deviation obtained by subtracting a target angular speed from the actual angular speed of the fan 46 (step S2). Specifically, the ECU 70 calculates the actual angular speed [rad] of the fan 46 based on the actual rotation speed [rpm] of the fan 46 detected by the rotation speed sensor 45, calculates the target angular speed [rad] based on the target rotation speed [rpm] of the fan 46, and calculates the angular speed deviation e by subtracting the target angular speed from the actual angular speed. The target rotation speed of the fan 46 is set in consideration of the rotation speed of the crankshaft 24, the vehicle speed, the temperature of coolant, or other parameters such as a set temperature of an air-conditioner of the vehicle 1. The angular speed deviation e is an example of the deviation parameter corresponding to the deviation that is a value obtained by subtracting the target rotation speed from the actual rotation speed of the fan 46. The process of step S2 is an example of the process executed by the acquisition unit.

Next, the ECU 70 determines whether or not an operating point of the fan 46, expressed by the angular acceleration $\alpha$ and the angular speed deviation e of the fan 46, belongs to a hunting predicted region (hereinafter, simply referred to as a predicted region) shown on a coordinate system having the angular acceleration $\alpha$ as a vertical axis and the angular speed deviation as a horizontal axis (step S3). In the predicted region, hunting that is a repetition of increase and decrease of the rotation speed of the fan 46 can be predicted to occur, when the operating point of the fan 46 belongs to the predicted region. The predicted region will be described later in detail.

When No in step S3, the ECU 70 executes a normal process (step S4). When Yes in step S3, the ECU 70 executes a hunting restraining process (step S5). The normal process and the hunting restraining process are similar in the point that the ECU 70 controls the electromagnet 63 through feedback control based on the angular speed deviation e. However, the normal process and the hunting restraining process are different in a control gain to be set. The processes of steps S3 to S5 are examples of the processes executed by the control unit.

Figure 4:
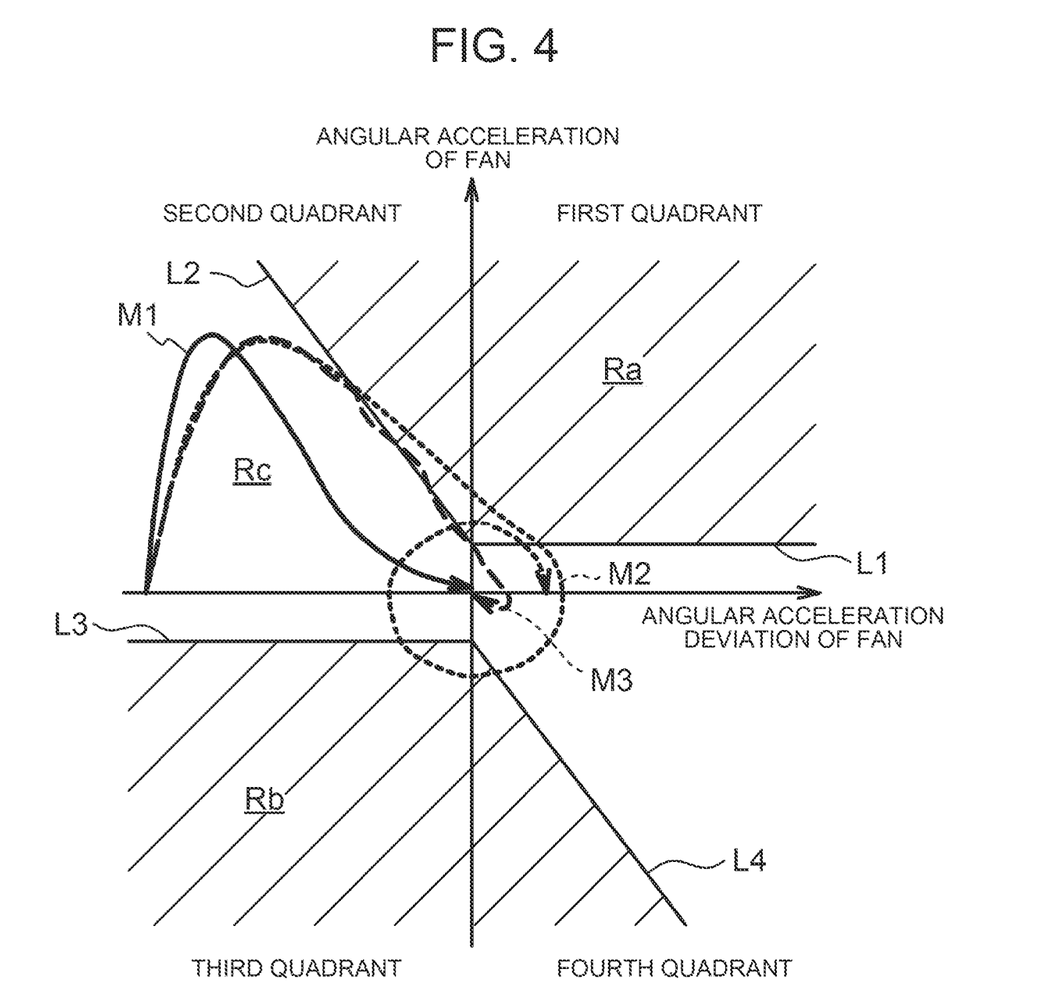
FIG. 4 shows an example of a coordinate system having angular acceleration of the fan as a vertical axis and angular speed deviation of the fan as a horizontal axis.

FIG. 4 shows an example of the coordinate system having the angular acceleration $\alpha$ of the fan 46 as a vertical axis and the angular speed deviation e of the fan as a horizontal axis. Shown on the coordinate system are predicted regions Ra, Rb where hunting is predicted to occur, and a non-predicted region Rc where hunting is not predicted to occur. The predicted region Ra occupies some part of respective first and second quadrants, and the predicted region Rb occupies some part of respective third and fourth quadrants. The non-predicted region Rc is a region other than the predicted regions Ra, Rb. The non-predicted region Rc is located between the predicted regions Ra, Rb, and occupies some part of the respective first to fourth quadrants. More specifically, in the range where the acceleration parameter and the deviation parameter can be obtained, a ratio of the predicted region Ra in the second quadrant is smaller than a ratio of the predicted region Ra in the first quadrant. A ratio of the predicted region Rb in the fourth quadrant is smaller than a ratio of the predicted region Rb in the third quadrant.

A track M1 represents a track of the operating point of the fan 46 in a normal state without the occurrence of hunting. The track M1 indicates that the operating point belongs to the non-predicted region Rc and moves to the origin without belonging to the predicted regions Ra, Rb. While the operating point belongs to the non-predicted region Rc, the normal process described above is executed. In the normal process, feedback control is executed based on a control gain that is set in consideration of the specification of the fan coupling device 50. A track M2 represents a track of the operating point in the case where hunting occurs. The track M2 indicates that the operating point passes through the predicted region Ra. For example, when a response delay occurs due to such reasons as variations and secular changes of the fan coupling device 50, hunting occurs as shown by the track M2. A track M3 represents a track of the operating point in the case where the hunting restraining process described above is executed while the operating point belongs to the predicted region Ra.

All the tracks M1 to M3 shown in FIG. 4 indicate the case where the angular speed deviation e shifts from minus to zero, that is, the case where the current angular speed of the fan 46 is slower than the target angular speed, so that it is requested to increase the rotation speed of the fan 46. Although not shown in FIG. 4, the tracks of the operating point in the case where the angular speed deviation e shifts from plus to zero, that is, the case where the current angular speed of the fan 46 is faster than the target angular speed and therefore it is requested to lower the rotation speed of the fan 46, are approximately symmetric to the tracks M1 to M3 with respect to the origin.

Hunting Restraining Control

Description is now given of the hunting restraining process. As shown in FIG. 4, while the operating point of the fan 46 belongs to the non-predicted region Rc, the normal process is executed. While the operating point belongs to one of the predicted regions Ra, Rb, the hunting restraining process is executed. For example, when PI control or PID control is performed in the normal process, an integral gain is lowered in the hunting restraining process so as to be lower than that in the normal process. Here, lowering the integral gain includes setting the integral gain to zero and practically performing P control or PD control.

When P control, PI control, PD control, or PID control is performed in the normal process, only the derivative gain may be increased in the hunting restraining process so as to be higher than that in the normal process. In this case, in the normal process, the derivative gain may be set to zero and thereby P control or PI control may practically be performed. In the hunting restraining process, the derivative gain may be set to a larger value than zero and thereby PD control or PID control may be achieved.

When PI control or PID control is performed in the normal process, then in the hunting restraining process, the integral gain may be made lower and the derivative gain may be made higher than those in the normal process. As described in the foregoing, in the hunting restraining process, at least one of lowering the integral gain to be lower than that in the normal process and increasing the derivative gain to be higher than that in the normal process may be performed.

By lowering the integral gain in this way, the hunting attributed to a phase delay by an integral term can be restrained. By increasing the derivative gain, a phase margin can be secured and hunting can be restrained.

FIG. 4 shows a boundary line L1 between the predicted region Ra and the non-predicted region Rc in the first quadrant, a boundary line L2 between the predicted region Ra and the non-predicted region Rc in the second quadrant, a boundary line L3 between the predicted region Rb and the non-predicted region Rc in the third quadrant, and a boundary line L4 between the predicted region Rb and the non-predicted region Rc in the fourth quadrant. In the example of FIG. 4, the boundary lines L1, L3 are linear and parallel to the horizontal axis. The boundary lines L2, L4 are linear, and as the angular speed deviation e approaches zero, the acceleration also approaches zero. The boundary line L1 and the boundary line L2 are connected to each other at a point where the angular speed deviation e is zero, and this point of connection is separated by a prescribed value from the origin. This is also the same in the boundary line L3 and the boundary line L4. In the first quadrant, the non-predicted region Rc is on the fourth quadrant side from the boundary line L1, and the predicted region Ra is on the opposite side of the boundary line L1 from the fourth quadrant. In the second quadrant, the non-predicted region Rc is on the third quadrant side from the boundary line L2, and the predicted region Ra is on the first quadrant side from the boundary line L2. In the third quadrant, the non-predicted region Rc is on the second quadrant side from the boundary line L3, and the predicted region Rb is on the opposite side of the second quadrant. In the fourth quadrant, the non-predicted region Rc is on the first quadrant side from the boundary line L4, and the predicted region Rb is on the third quadrant side from the boundary line L4.

As shown in FIG. 4, the track M3 enters the predicted region Ra in the second quadrant. Accordingly, before hunting actually occurs, the hunting restraining process can be executed. In other words, the boundary line L2 is set at the positions where the operating point may pass when hunting occurs due to a response delay. Thus, the predicted regions Ra, Rb where the hunting can be predicted to occur are prescribed based on the track of the operating point even before the hunting actually occurs, and the hunting restraining process is executed while the operating point belongs to one of the predicted regions Ra, Rb. As a result, the occurrence of the hunting can be restrained before the hunting actually occurs.

As shown in FIG. 4, the non-predicted region Rc includes a prescribed range around the origin. In other words, the predicted regions Ra, Rb are apart from the prescribed range around the origin. Hence, even in the case where the operating point enters the predicted region Ra and thereby the hunting restraining process is executed, the hunting restraining process is stopped and the normal process is executed once the operating point approaches the origin and goes out of the predicted region Ra. For example, in the case where PI control or PID control is performed as the normal process, and P control or PD control is executed as the hunting restraining process, steady-state deviation can be absorbed by restarting I control in the vicinity of the origin. This facilitates control to coincide the actual angular speed with the target angular speed of the fan 46. This is also the same as when the angular speed deviation e shifts from plus to zero.

Only while the operating point belongs to one of the predicted regions Ra, Rb, the normal process is restricted and the hunting restraining process is executed. Therefore, when a response delay occurs due to a temporary cause, the hunting restraining process is executed. Once the cause is eliminated and the operation of the fan returns to normal, the normal process is restarted. Thus, the hunting restraining control can also cope with the response delay which occurs temporarily.

For example, when the angular speed deviation e shifts from minus to zero, and the fan 46 has a small angular speed at the time when the operating point passes the vertical axis, and the operating point belongs to the non-predicted region Rc without belonging to the predicted region Ra, it is predicted that a large hunting does not occur although overshoot does occur. In such a case, the normal process is executed, and unnecessary execution of the hunting restraining process can be prevented.

The shapes or the sizes of the predicted regions Ra, Rb and the non-predicted region Rc are not limited to those of FIG. 4. Although the boundary lines L1 to L4 are linear in FIG. 4, their shape is not limited thereto. The boundary line L2 may be curved, for example, such that an angle of gradient may become gradually gentler or such that the angle of gradient may become gradually steeper, as the angular speed deviation e approaches zero. This is also the same as in the boundary line L4. Although the boundary lines L1, L3 are parallel to the horizontal axis, they are not limited thereto.

Modification of Predicted Region

Figure 5A:
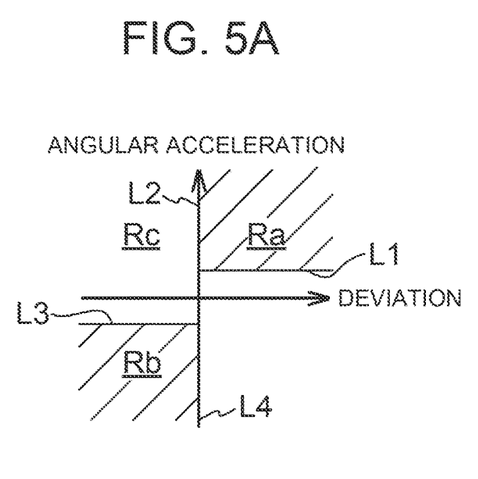
FIG. 5A shows a modification of predicted regions.

Description is now given of a modification of the predicted regions Ra, Rb. FIGS. 5A to 6C show modifications of the predicted regions Ra, Rb. In FIG. 5A, the boundary lines L2, L4 are set on the vertical axis. This means that the entire second and fourth quadrants are set in the non-predicted region Rc. The example of FIG. 5A is suitable to such a case where, for example, the angular speed deviation e shifts from minus to zero, and due to the characteristics of the fan coupling device 50, it is hard to predict the occurrence of hunting while the operating point is in the second quadrant.

Figure 5B:
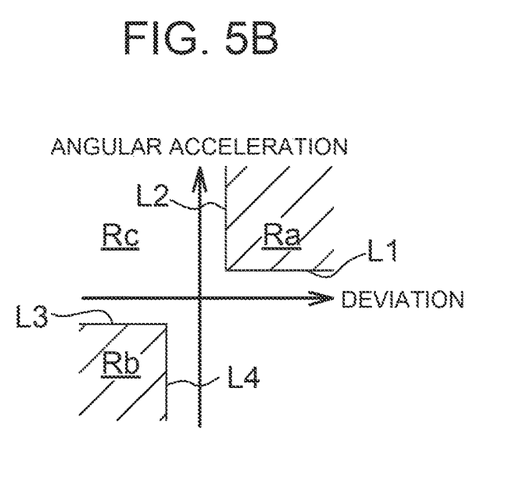
FIG. 5B shows a modification of the predicted regions.

In FIG. 5B, the boundary line L2 is set on some part of the first quadrant that is parallel to the vertical axis and apart from the vertical axis. The boundary line L4 is set on some part of the third quadrant that is parallel to the vertical axis and apart from the vertical axis. The example of FIG. 5B is suitable to such a case where, for example, the angular speed deviation e shifts from minus to zero, and due to the characteristics of the fan coupling device 50, hunting occurs only when a response delay is large to the extent that the operating point moves to the first quadrant and belongs to the predicted region Ra.

Figure 5C:
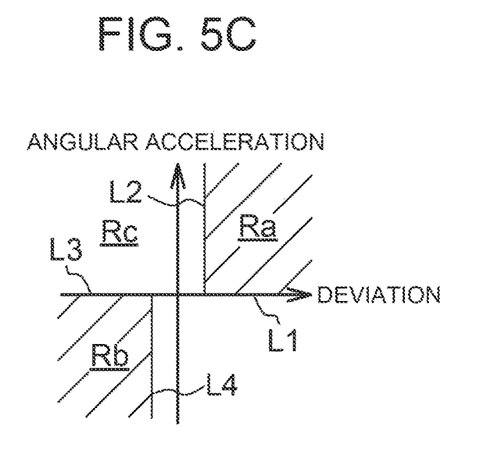
FIG. 5C shows a modification of the predicted regions.

In FIG. 5C, the boundary lines L1, L3 are set on the horizontal axis. The boundary line L2 is set on some part of the first quadrant that is parallel to the vertical axis and apart from the vertical axis. The boundary line L4 is set on some part of the third quadrant that is parallel to the vertical axis and apart from the vertical axis. The example of FIG. 5C is suitable to such cases where, for example, the angular speed deviation e shifts from minus to zero, and due to the characteristics of the fan coupling device 50, hunting occurs only when a response delay is large to the extent that the operating point moves to the first quadrant and belongs to the predicted region Ra, and it is sufficient to restart the normal process at the time when the operating point goes out of the predicted region Ra of the first quadrant and enters the fourth quadrant.

Figure 5D:
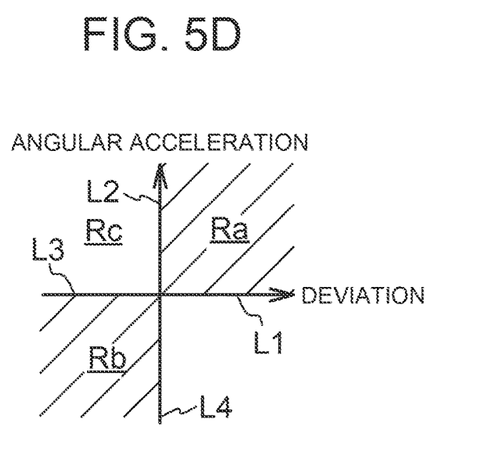
FIG. 5D shows a modification of the predicted regions.

In FIG. 5D, the boundary lines L1, L3 are set on the horizontal axis, and the boundary lines L2, L4 are set on the vertical axis. In other words, the entire first quadrant is set as the predicted region Ra, the entire third quadrant is set as the predicted region Rb, and the entire second and fourth quadrants are set as the non-predicted region Rc. The example of FIG. 5D is suitable to such cases where, for example, the angular speed deviation e shifts from minus to zero, and due to the characteristics of the fan coupling device 50, hunting occurs when the operating point enters the first quadrant, hunting tends to occur also when the angular acceleration α is small at the time of the operating point entering the first quadrant, or it is sufficient to restart the normal process at the time when the operating point is out of the predicted region Ra of the first quadrant and enters the fourth quadrant.

Figure 6A:
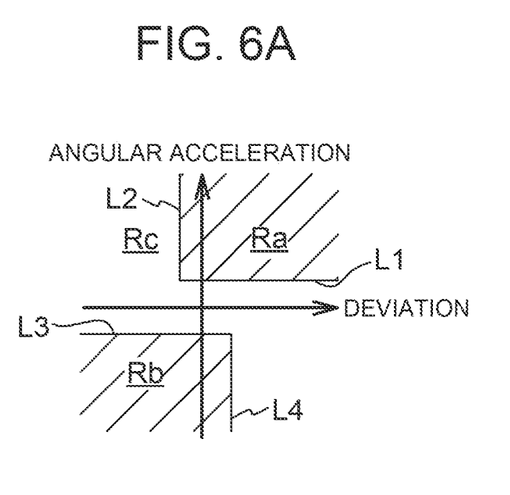
FIG. 6A shows a modification of the predicted regions.

In FIG. 6A, the boundary lines L1, L3 are parallel to the horizontal axis and apart from the horizontal axis. The boundary line L1 crosses the vertical axis, and extends to the second quadrant. The boundary line L2 is parallel to the vertical axis, and set in the second quadrant. The boundary line L3 crosses the vertical axis, and extends to the fourth quadrant. The boundary line L4 is parallel to the vertical axis, and set in the fourth quadrant. The example of FIG. 6A is suitable to such cases where, for example, the angular speed deviation e shifts from minus to zero, and due to the characteristics of the fan coupling device 50, the hunting tends to occur when the angular speed deviation e is greater than a prescribed value (negative value), and the angular acceleration α is equal to or greater than a prescribed value.

Figure 6B:
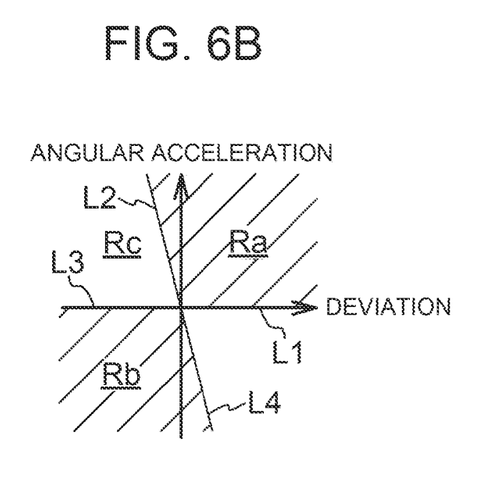
FIG. 6B shows a modification of the predicted regions.

In FIG. 6B, the boundary lines L1, L3 are set on the horizontal axis, and extend to the origin. The boundary lines L2. L4 pass through the origin and extend such that the angular acceleration α approaches zero as the angular speed deviation e approaches zero. The angle of gradient of the boundary lines L2, L4 shown in FIG. 6B is steeper than the angle of gradient of the boundary lines L2, L4 shown in FIG. 4. The example of FIG. 6B is suitable to such a case where, for example, the angular speed deviation e shifts from minus to zero, and due to the characteristics of the fan coupling device 50, hunting tends to occur also when the angular acceleration α is small at the time of the operating point entering the first quadrant. In this case, when a response delay is larger, the hunting restraining process is desirably executed earlier than when the response delay is smaller.

Figure 6C:
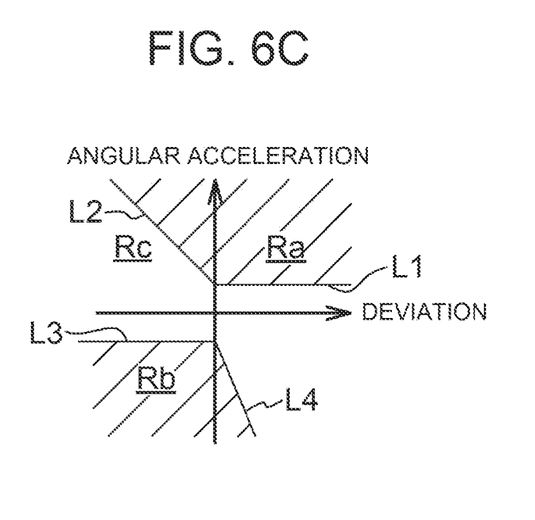
FIG. 6C shows a modification of the predicted regions.

In FIG. 6C, the boundary lines L2, L4 are different in angle of gradient. The angle of gradient of the boundary line L2 is gentler than that of the boundary line L4. In other words, in FIG. 6C, the predicted regions Ra, Rb are asymmetric to each other with respect to the origin. For example, the example of FIG. 6C is suitable to such a case where due to the characteristics of the fan coupling device 50, the possibility of the occurrence of hunting with respect to the degree of a response delay is different between when the angular speed deviation e shifts from minus to zero and when the angular speed deviation e shifts from plus to zero.

Modification of Hunting Prediction and Restraining Control

Figure 7:
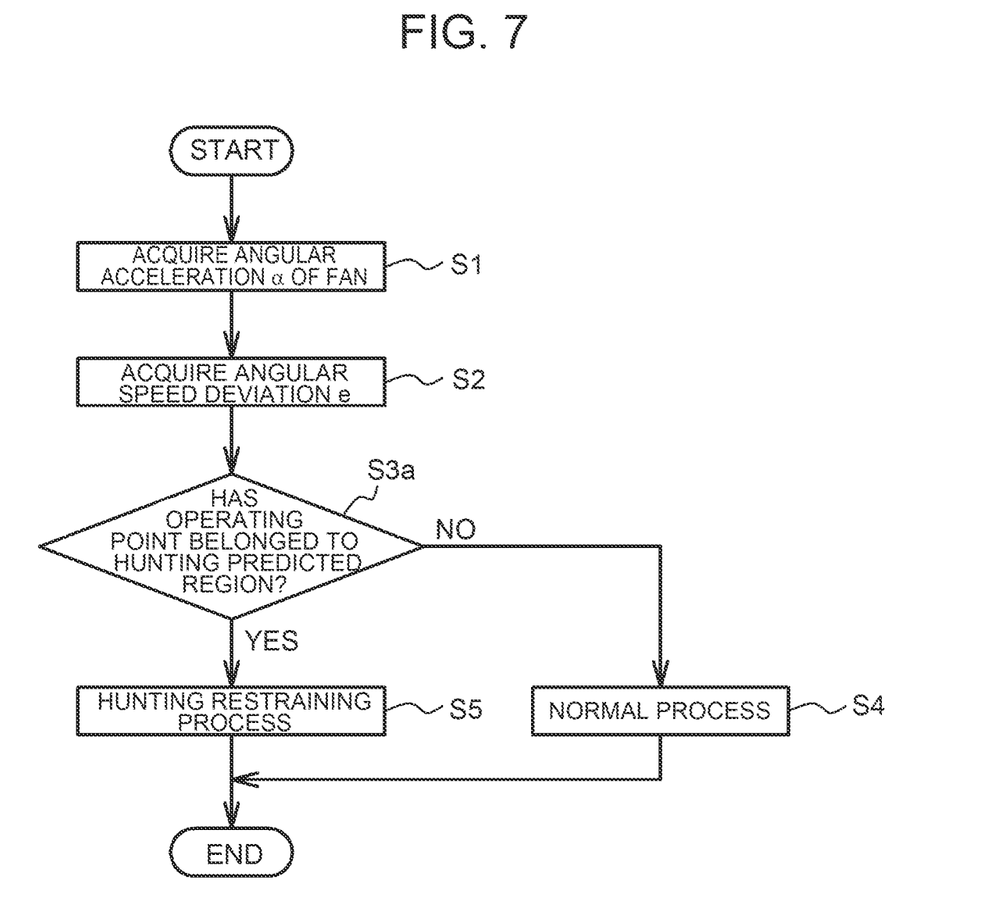
FIG. 7 is a flowchart showing a modification of the hunting prediction and restraining control executed by the ECU.

Description is now given of a modification of the hunting prediction and restraining control. FIG. 7 is a flowchart showing the modification of the hunting prediction and restraining control executed by the ECU 70. After executing steps S1 and S2 described above, the ECU 70 determines whether or not the operating point of the fan 46 has ever belonged to the hunting predicted region in the past (step S3a). When No in step S3a, the ECU 70 executes the normal process (step S4). When Yes in step S3a, the ECU 70 executes the hunting restraining process (step S5). In short, when the operating point of the fan 46 has belonged to the predicted region at least once in the past, the hunting restraining process is constantly executed. Thus, since the hunting restraining process is constantly executed, the occurrence of hunting can effectively be restrained.

In the present modification, the predicted regions Ra, Rb and the non-predicted region Rc may be set as shown in FIGS. 4 to 6C. However, the predicted regions Ra, Rb and the non-predicted region Rc are not limited to the illustrated configuration. For example, in the examples of FIGS. 4 and 6A to 6C, the predicted regions Ra, Rb may be set only in the second and fourth quadrants, and the entire first and third quadrants may be set as the non-predicted region Rc. In this case, in the case where, for example, the angular speed deviation e shifts from minus to zero, hunting can be predicted at an early stage with the predicted region Ra set in the first quadrant.

In the embodiment and modifications described above, the angular acceleration α is used as the acceleration parameter corresponding to the actual rotation speed of the fan 46. However, without being limited to this, the actual rotation acceleration [rpm/s] of the fan 46 itself may be used. As the deviation parameter corresponding to the deviation that is a value obtained by subtracting the target angular speed from the actual angular speed of the fan 46, a deviation obtained by subtracting the target rotation speed from the actual rotation speed of the fan 46 is used. However, without being limited to this, a deviation obtained by subtracting the target rotation speed [rpm] from the actual rotation speed [rpm] of the fan 46 may be used.

In the examples used in the embodiment and modifications described above, the fan coupling device 50 and the ECU 70 are mounted on the vehicle 1. However, the fan coupling device 50 and the ECU 70 may be mounted on other than the vehicle.

Although the embodiment of the present disclosure has been described in detail, the applicable embodiment is not limited to such specific embodiments. Various modifications and changes may be made without departing from the scope of the present disclosure.

What is claimed is:

1. A controller of a fan coupling device, the fan coupling device including a drive shaft that is rotationally driven, a rotor coupled to the drive shaft, a housing configured to house the rotor, the housing being supported so as to be rotatable relative to the rotor, a fan fixed to the housing, a labyrinth chamber formed between the housing and the rotor in the housing and configured to transmit rotational motive power of the rotor to the housing through working fluid, and a regulation mechanism configured to regulate an amount of the working fluid in the labyrinth chamber, the controller comprising:
an acquisition unit configured to acquire an acceleration parameter corresponding to an actual rotation acceleration of the fan and a deviation parameter corresponding to a deviation that is a value obtained by subtracting a target rotation speed of the fan from an actual rotation speed of the fan;
a control unit configured to control the regulation mechanism by feedback control based on the deviation parameter;
a prediction unit configured to predict that hunting occurs in the rotation speed of the fan, when an operating point of the fan expressed with the deviation parameter and the acceleration parameter belongs to a predicted region, out of the predicted region and a non-predicted region other than the predicted region defined by a coordinate system having the deviation parameter as a horizontal axis and the acceleration parameter as a vertical axis; and
a restraining unit configured to execute, when the hunting is predicted to occur, a hunting restraining process of executing at least one of lowering an integral gain of the feedback control to be lower than when the hunting is not predicted to occur and increasing a derivative gain of the feedback control to be higher than when the hunting is not predicted to occur.

2. The controller according to claim 1, wherein:
the predicted region is at least in some part of a first quadrant and some part of a third quadrant of the coordinate system; and
the non-predicted region is at least in some part of a second quadrant and some part of a fourth quadrant of the coordinate system.

3. The controller according to claim 1, wherein in the first quadrant of the coordinate system, a first boundary line indicating a boundary between the predicted region and the non-predicted region is apart from the horizontal axis and extends along the horizontal axis, the non-predicted region is on a side of the fourth quadrant of the coordinate system from the first boundary line, and the predicted region is on an opposite side of the fourth quadrant from the first boundary line.

4. The controller according to claim 1, wherein a second boundary line indicating a boundary between the predicted region and the non-predicted region in the second quadrant of the coordinate system is apart from the horizontal axis such that the deviation parameter approaches zero as the acceleration parameter approaches zero, the predicted region is on a side of the first quadrant of the coordinate system from the second boundary line, and the non-predicted region is on a side of the third quadrant of the coordinate system.

5. The controller according to claim 1, wherein
in the third quadrant of the coordinate system, a third boundary line indicating a boundary between the predicted region and the non-predicted region is apart from the horizontal axis and extends along the horizontal axis, the non-predicted region is on a side of the second quadrant of the coordinate system from the third boundary line, and the predicted region is on an opposite side of the second quadrant of the coordinate system from the third boundary line.

6. The controller according to claim 1, wherein a fourth boundary line indicating a boundary between the predicted region and the non-predicted region in the fourth quadrant of the coordinate system is apart from the horizontal axis such that the deviation parameter approaches zero as the acceleration parameter approaches zero, the predicted region is on a side of the third quadrant of the coordinate system from the fourth boundary line, and the non-predicted region is on a side of the first quadrant.

7. The controller according to claim 1, wherein the non-predicted region includes a prescribed range around an origin of the coordinate system in the fourth quadrant of the coordinate system.

8. The controller according to claim 1, wherein the non-predicted region includes a prescribed range around the origin of the coordinate system in the second quadrant of the coordinate system.

9. The controller according to claim 1, wherein the non-predicted region includes a prescribed range around the origin of the coordinate system.

10. The controller according to claim 1, wherein the predicted region is symmetric with respect to the origin in the coordinate system.

11. The controller according to claim 1, wherein the predicted region is asymmetric with respect to the origin in the coordinate system.

12. The controller according to claim 1, wherein the restraining unit executes, while the operating point of the fan belongs to the predicted region, at least one of lowering the integral gain to be lower than while the operating point of the fan belongs to the non-predicted region and increasing the derivative gain to be higher than while the operating point of the fan belongs to the non-predicted region as the hunting restraining process, and stops the hunting restraining process while the operating point of the fan is out of the predicted region and belongs to the non-predicted region.

13. The controller according to claim 1, wherein after the hunting is predicted to occur, the restraining unit executes, as the hunting restraining process, at least one of lowering the integral gain to be lower than before the hunting is predicted to occur and increasing the derivative gain to be higher than before the hunting is predicted to occur.

* * * * *